(12) United States Patent
Abbe et al.

(10) Patent No.: US 6,714,128 B2
(45) Date of Patent: Mar. 30, 2004

(54) MOTOR VEHICLE LIGHTING SYSTEM

(76) Inventors: David C. Abbe, 1780 E. Chase Ave., El Cajon, CA (US) 92020; Thomas H. Rudd, 220 Cedar Dr. West, Hudson, WI (US) 54015

(*) Notice: Subject to any disclaimer, the term of this patent is extended or adjusted under 35 U.S.C. 154(b) by 0 days.

(21) Appl. No.: 10/100,289

(22) Filed: Mar. 18, 2002

(65) Prior Publication Data

US 2002/0171543 A1 Nov. 21, 2002

Related U.S. Application Data

(63) Continuation-in-part of application No. 09/960,667, filed on Sep. 21, 2001.
(60) Provisional application No. 60/291,575, filed on May 17, 2001.

(51) Int. Cl.$^7$ .................................................. B60Q 1/26
(52) U.S. Cl. ........................ 340/468; 340/464; 340/465; 340/471; 340/479; 174/70 B; 174/99 B; 361/675; 710/107; 710/112
(58) Field of Search ................................. 340/468, 479, 340/541, 465, 464, 471; 362/541, 800, 499; 174/70 B, 68.1, 149 R, 99 B; 710/106, 107, 108, 109, 110, 112; 361/675, 42, 43, 44; 326/86

(56) References Cited

U.S. PATENT DOCUMENTS

| | | | |
|---|---|---|---|
| 3,650,398 A | * 3/1972 | Kalthoff et al. | 340/549 |
| 4,733,335 A | 3/1988 | Serizawa et al. | 362/80 |
| 4,868,719 A | * 9/1989 | Kouchi et al. | 362/548 |
| 5,093,768 A | 3/1992 | Ohe | 362/241 |
| 5,101,326 A | 3/1992 | Roney | 362/61 |
| 5,388,035 A | 2/1995 | Bodem, Jr. | 362/61 |
| 5,463,280 A | 10/1995 | Johnson | 315/187 |
| 5,469,150 A | 11/1995 | Sitte | 340/825.07 |
| 5,486,808 A | 1/1996 | Nejdl | 340/464 |
| 5,528,474 A | 6/1996 | Roney et al. | 362/249 |
| 5,567,036 A | 10/1996 | Theobald et al. | 362/80 |
| 5,570,951 A | 11/1996 | Bertling et al. | 362/231 |
| 5,669,703 A | 9/1997 | Wheeler et al. | 362/249 |
| 5,765,840 A | 6/1998 | Tame | 297/330 |
| 5,793,615 A | 8/1998 | Bach et al. | 361/752 |
| 6,006,143 A | 12/1999 | Bartel et al. | 701/1 |
| 6,097,283 A | * 8/2000 | Szudarek et al. | 340/431 |
| 6,202,018 B1 | 3/2001 | Stumpe et al. | 701/70 |
| 6,250,788 B1 | * 6/2001 | Muller | 362/541 |
| 6,273,771 B1 | 8/2001 | Buckley et al. | 440/84 |
| 6,276,822 B1 | 8/2001 | Bedrosian et al. | 362/545 |
| 6,282,668 B1 | 8/2001 | Neudecker | 713/324 |

OTHER PUBLICATIONS

Patent Application Ser. No. 09/960,667, filed Sep. 21, 2001, entitled "Led Turn Signals and Tail/Brake Lights for Vehicles".

KuryAkyn Catalog, p. 21, published—Dec. 1999.

* cited by examiner

*Primary Examiner*—Davetta W. Goins
(74) *Attorney, Agent, or Firm*—Westman, Champlin & Kelly

(57) ABSTRACT

A motor vehicle lighting system includes a master controller, a smart light, and a hot bus. The master controller is electrically couplable to a power supply and is adapted to receive an input signal corresponding to a left turn signal, a right turn signal, a run signal, or a brake signal. The master controller also includes a digital command signal output that is produced in response to the input signal. The smart light includes a light controller and a plurality of light emitting diodes (LED's). The light controller is adapted to control the LED's in response to the command signal. The hot bus electrically couples the master controller to the smart light. Power and the command signal are provided to the smart light over the hot bus.

18 Claims, 6 Drawing Sheets

| COMMAND SIGNALS | Left Turn Signal | | Circuit Functions | | Fender Lights | | | | Right Turn Signal | |
|---|---|---|---|---|---|---|---|---|---|---|
| | Amber | Red | Amber | Red | Amber | Red | Amber | Red | Amber | Red |
| On | off | LO | off | LO | off | LO | off | LO | off | LO |
| Brake | off | F/BHI* | off | F/BHI* | off | F/BHI* | off | F/BHI* | off | F/BHI* |
| 4-Way | Flashing | off | Flashing | off | Flashing | off | Flashing | off | Flashing | off |
| Brake & 4-Way | Flashing | off | Flashing | F/BHI* | Flashing | F/BHI* | Flashing | off | Flashing | off |
| Left Turn | Flashing | off | Flashing | off | off | LO | off | LO | off | LO |
| Brake & Left Turn | Flashing | off | Flashing | off | off | F/BHI* | off | F/BHI* | off | F/BHI* |
| Right Turn | off | LO | off | LO | Flashing | off | Flashing | off | Flashing | off |
| Brake & Right Turn | off | F/BHI* | off | F/BHI* | Flashing | off | Flashing | off | Flashing | off |

*"F/BHI" function is 2-second flashing "HI" @ 6 Hz (12 flashes) with "HI" on for duration. When the breaks are "pumped" faster than 2-second rate, it will flash constantly.

FIG. 7

MOTOR VEHICLE LIGHTING SYSTEM

CROSS REFERENCE TO RELATED APPLICATION

The present invention is a continuation-in-part of U.S. patent application Ser. No. 09/960,667, filed on Sep. 21, 2001 for inventors David C. Abbe and Thomas H. Rudd and entitled "LED TURN SIGNALS AND TAIL/BRAKE LIGHTS FOR VEHICLES," which in turn claims priority to U.S. Provisional Patent Application No. 60/291,575 filed on May 17, 2001, both of which are incorporated herein by reference.

FIELD OF THE INVENTION

The present invention relates to a lighting system for use in a motor vehicle. More particularly, the present invention relates to a lighting system that communicates digital command signals to smart lights, which interpret the command signals and control light emitting diodes in response to the command signals.

BACKGROUND OF THE INVENTION

Traditional lighting systems of motor vehicles, particularly motorcycles, require the wiring of power to each light through an activating switch. Additionally, these traditional lighting systems provide only simple actuation of the lights, typically, "on" and "off" modes. For example, the brake light is generally wired to the brake such that brake power is applied to the brake light when the brake is actuated to thereby energize the brake light.

Aftermarket lighting systems have been designed to replace the original equipment of the motor vehicle. One such lighting system is described in the above-identified U.S. patent application. These lighting systems receive the power input signals from the activating switches in the same manner as the original equipment, but can provide additional features, such as providing brake lights in the turn signal lights. The addition of such features can require additional wiring to be run between lights, which can complicate installation.

A continuing need exists for lighting systems for motor vehicles that provide improved safety features and functionality while simplifying their installation either as original equipment or as an after aftermarket product.

SUMMARY OF THE INVENTION

The present invention is directed to a motor vehicle lighting system that is easy to install and provides more lighting features and improved safety. The motor vehicle lighting system includes a master controller, a smart light, and a hot bus. The master controller is electrically couplable to a power supply and is adapted to receive an input signal corresponding to a left turn signal, a right turn signal, a run signal, or a brake signal. The master controller also includes a digital command signal output that is produced in response to the input signal. The smart light includes a light controller and a plurality of light emitting diodes (LED's). The light controller is adapted to control the LED's in response to the command signal. The hot bus electrically couples the master controller to the smart light. Power and the command signal are provided to the smart light over the hot bus.

The present invention is also directed to a method of controlling a lighting system of a motor vehicle. In a first step of the method, an input signal corresponding to a left turn signal, a right turn signal, a run signal, or a brake signal is received. Next, a digital command signal is produced in response to the input signal. Power and the command signal are then provided to a smart light having a plurality of LED's and a light controller over a hot bus. Finally, the LED's are controlled in response to the command signal using the light controller.

The features and benefits that characterize embodiments of the present invention will be apparent reading the following detailed description and review of the associated drawings.

BRIEF DESCRIPTION OF THE DRAWINGS

FIG. 7 is a table illustrating examples of various smart light circuit functions that could be performed in response to command signals from the master controller, in accordance with an embodiment of the invention.

DETAILED DESCRIPTION OF THE PREFERRED EMBODIMENTS

Figure 1:
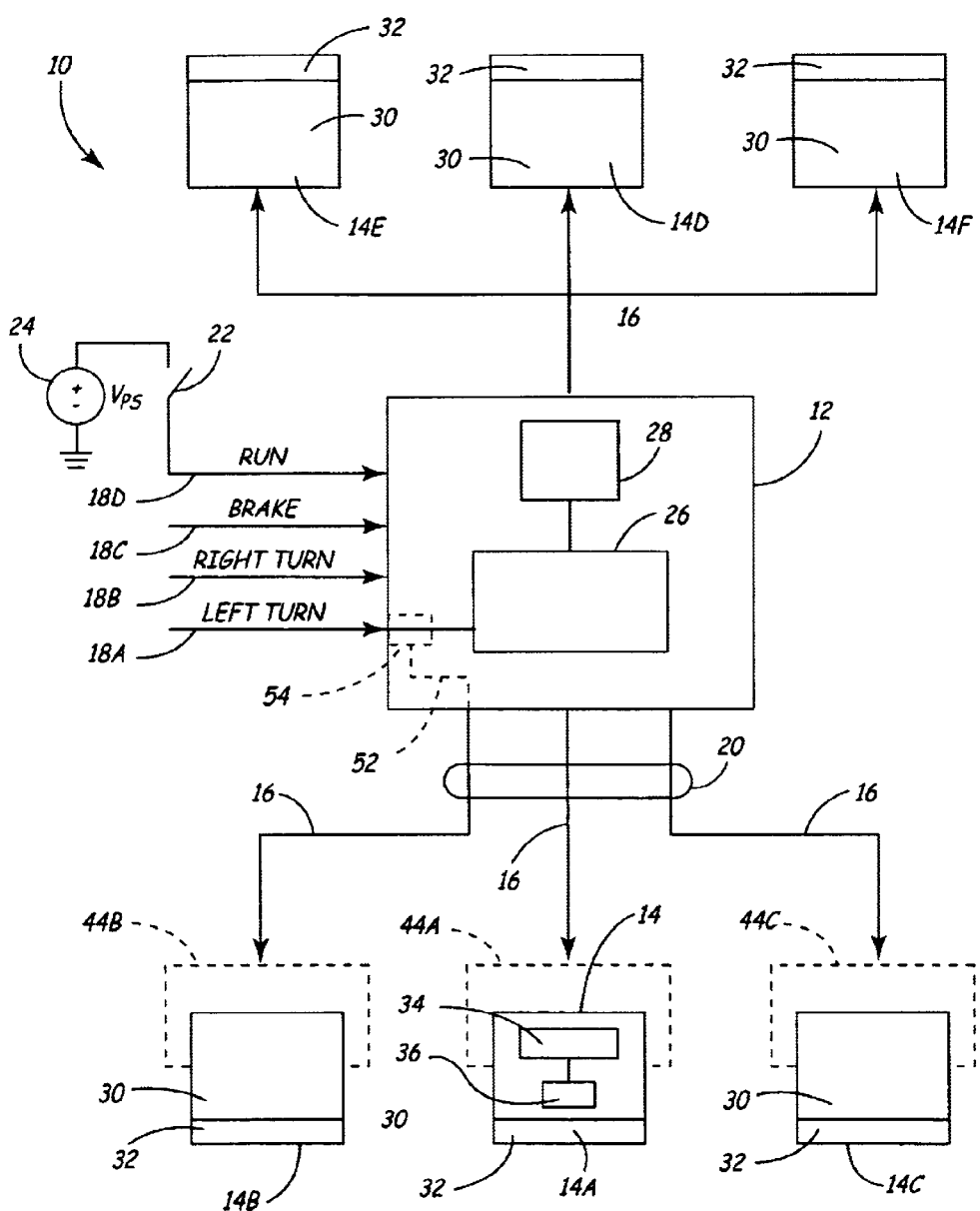
FIG. 1 is a simplified diagram of a motor vehicle lighting system in accordance with various embodiments of the invention.

FIG. 1 is a simplified diagram of a motor vehicle lighting system, generally designated as 10, in accordance with various embodiments of the invention. FIG. 1 shows lighting system 10 being configured for use with a motorcycle. This is by way of illustration only, and it is to be understood that the lighting system 10 of the present invention is applicable to all types of vehicles, including large trucks, automobiles and other vehicles where brake lights, run lights and turn signal lights are used.

Lighting system 10 generally includes a master controller 12, at least one smart light 14, and a hot bus 16 coupling master controller 12 to the smart light. In operation, master controller 12 is couplable to a power supply 24 and is adapted to receive an input signal 18 and produce a digital command signal output in response to the input signal. The input signal 18 can take the form of a left turn signal 18A, a right turn signal 18B, a brake signal 18C, a run signal 18D or other input signal. The smart light 14 includes a light controller 30 and a plurality of light emitting diodes (LED's) 32. The light controller 30 is adapted to control the LED's 32 in response to the command signal. The hot bus 16 electrically couples the master controller 12 to the smart light 14 and provides power and the command signal output to the smart light 14.

Master controller 12 generally includes a microprocessor 26 and a memory 28, which are preferably formed as a single integrated circuit. Memory 28, such as RAM and programmable ROM stores program instructions that are executable by microprocessor 26. Microprocessor 26 receives input signals 18A–18D and can generate the command signal over hot bus 16 in response thereto.

The input signals 18 are typically DC voltage signals that are switched between ground and the voltage of the power supply 24, typically 12 volts (V). The voltage of the input signals can be regulated as needed by master controller 12 depending on the operating voltages of the inputs to microprocessor 12. The run signal 18D is typically generated in response to actuation of an ignition switch 22 which couples to power supply 24 and provides power from power supply 24 to master controller 12. Brake signal 18C is generally provided in response to actuation of a brake. Similarly, actuation of a left or right turn signal switch generates the corresponding left or right turn signal 18A or 18B.

In the motorcycle example shown in FIG. 1, lighting system 10 includes multiple smart lights 14A–14F. Smart lights 14A–14C respectively correspond to a center tail light, a left tail light, and a right tail light. Smart lights 14D–F respectively correspond to a headlight, a left turn light, and a right turn light. Headlight 14D may utilize a halogen or other high power lighting component rather than LED's 32. Additional smart lights can be added to system 10 to provide, for example, brake lighting on a trailer or other accessory lighting. The light controller 30 of smart lights 14 can include a microprocessor 34 and a memory 36, as shown in smart light 14A of FIG. 1, which are preferably formed in a single integrated circuit.

Hot bus 16 is preferably formed of a single wire that links each of the smart lights 14 to master controller 12, as is generally indicated in FIG. 1 with the connection between master controller 12 and smart lights 14D–14F. This configuration reduces the amount of wiring that is required for the lights which reduces weight and simplifies the installation of the lighting system. However, for aftermarket installations, an existing wiring harness 20, may provide individual hot bus line feeds between master controller 12 and smart lights 14. In addition to providing the command signals to the smart lights 14 over hot bus 16, power, in the form of a DC voltage relative to ground, is also provided over hot bus 16. Ground level voltage for the smart lights 14 can be provided by a separate wire, which is typically included in existing wiring harnesses, or through the frame of the motor vehicle. It is generally preferred to provide the ground level voltage through the frame of the vehicle to reduce wiring and the complexity of the installation.

The digital command signal output or command signals produced by master controller 12 generally take the form of multi-bit codes, which are produced on hot bus 16 by rapidly switching the voltage of hot bus 16 between a high state (normally 12V) at which hot bus 16 is normally at when run input signal 18D is activated, and a low state corresponding to ground level voltage. Thus, the command signals comprise a series of logic ones and zeros corresponding to, for example, the high and low states of hot bus 16. In accordance with one embodiment, the command signals comprise 8 bits of data. The number of bits used for the command signal can be increased or decreased as desired.

Light controller 30 is adapted to receive the command signal over hot bus 16 and control LED's 32 in response thereto. In accordance with one embodiment, the various command signals each correspond to an address stored in memory 36 of light controller 30. Here, microprocessor 34 checks for instructions stored in memory 36 corresponding to the address represented by the command signal and controls LED's 32 in accordance with the instructions. In the event that the command signal does not correspond to any instructions stored in memory 36 or the instructions indicate that no changes to the current mode of operation should be made, light controller 30 does nothing. In this manner, multiple smart lights 14 can be coupled to a single hot bus 16 and can be individually controlled by simply providing unique addresses for their instructions or by appropriate programming of the memory 36.

In operation, the run signal 18D is generated when the ignition switch 22 is closed. Typically, the run signal 18D activates power on hot bus 16. Additionally, either in response to a command signal from master controller 12 or in response to receiving power, the light controller 30 of at least center tail light 14A activates its LED's 32 in a run mode, in which they are energized at a low-level. Actuation of the brake, generates brake signal 18C and a corresponding command signal from master controller 12, which causes light controller 30 of at least center tail light 14A to activate its LED's 32 in a brake mode, in which they are energized at a high-level thereby causing them to run brighter than when in the run mode. Similarly, command signals produced by master controller 12 in response to receipt of left or right turn signals 18A and 18B, respectively causes the light controllers 30 of left and right tail lights 14A and 14B to flash their LED's 32 at a turn signal rate. Additional features that can be provided by the smart lights will be discussed in greater detail below.

Figure 2:
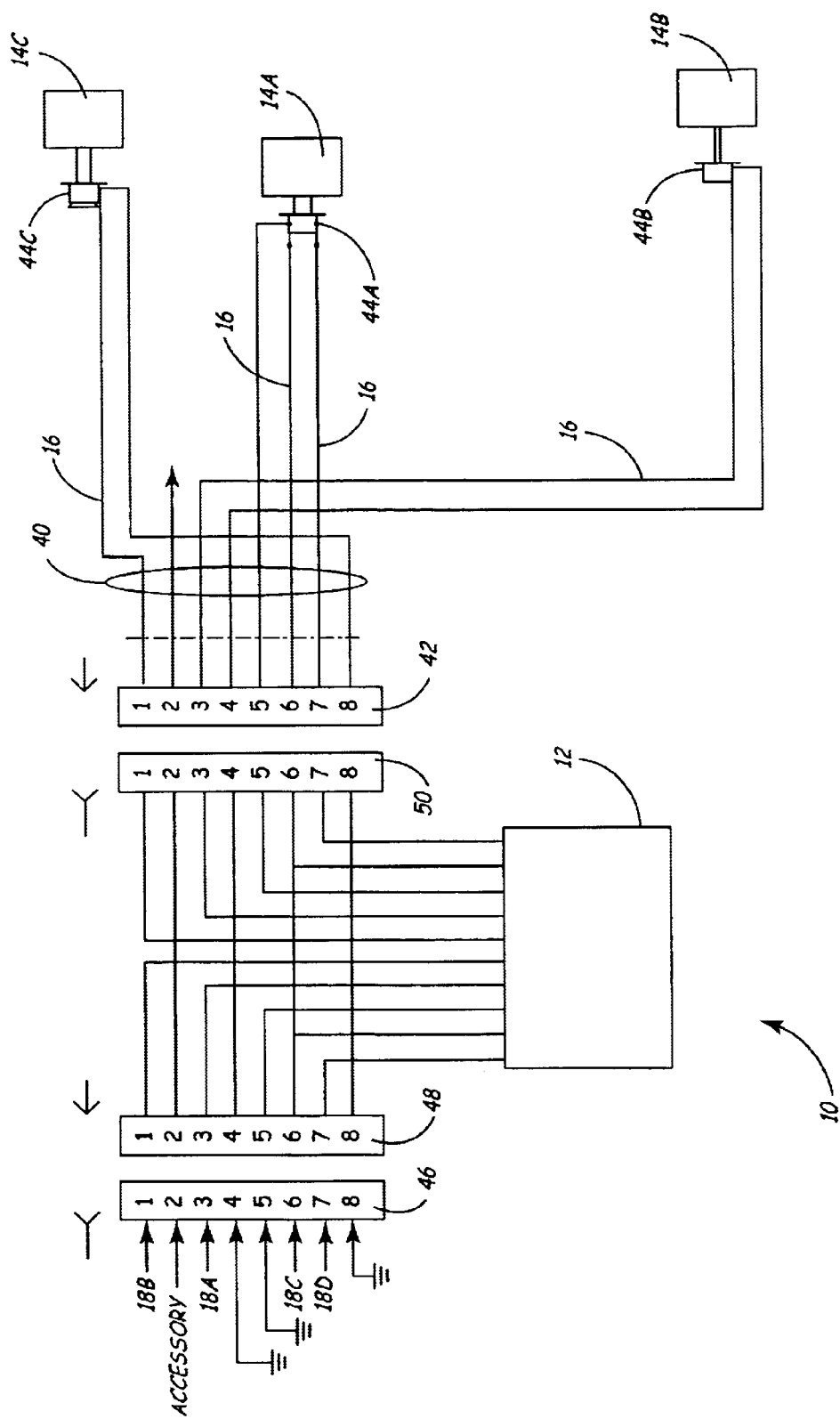
FIG. 2 illustrates an exampled of the motor vehicle lighting system that is installed as an aftermarket device.

As mentioned above, lighting system 10 can be formed as part of the original motor vehicle equipment or as an aftermarket "plug-in" system or kit. FIG. 2 illustrates an example of lighting system 10 that is installed as an aftermarket device for a motorcycle. Typical motorcycles and other motor vehicles include a wiring harness, such as an 8-pin wiring harness 40 that includes an 8-pin connector 42 and wires that extend from connector 42 to existing light sockets 44A–44C. The center tail light 14A, left tail light 14B and right tail light 14C mount to the corresponding sockets 44A–44C. Input power signals are provided on a cooperating 8-pin connector 46, which normally directly couples to connector 42. The input power signals include turn signal 18A, right turn signal 18B, brake signal 18C, and run signal 18D. Ground level voltage and accessory lighting signals are provided at the remaining pins.

The present invention makes use of the existing wiring by inserting the master controller 12 at the junction between the input signals and the wiring to the lights. Here the smart lights 14 mount to the existing sockets 44A–44C (shown as sockets 44 in FIG. 1). In this embodiment, master controller 12 includes cooperating input and output connectors 48 and 50 to respectively couple to connectors 46 and 42 of the original wiring. The input signals are appropriately routed to the microprocessor 26 (FIG. 1) of master controller 12 and the responsively generated digital command signals are provided to the appropriate pins of connector 50. In this manner, the signal carrying lines of wiring harness 40 are used as individual hot bus 16 lines, which provide power and command signals to the smart lights 14A–14C through sockets 44A–44C. One advantage to this arrangement is that it eliminates a need to form direct connections between the individual tail lights, which can complicate installation.

Bypass connections can be provided to allow one or more input signals 18 to bypass master controller 12 such that the input signal 18 is directly routed to the corresponding light. For example, a bypass connection 52 can be provided to route left turn input signal 18A directly to socket 44B, when the original light is attached thereto, as shown in FIG. 1. A switch 54 can be provided to enable or disable bypass connection 52. As a result, master controller 12 can be configured to control only the hot bus lines 16 that are connected to smart lights 14 while non-smart lights are controlled substantially in accordance with the original configuration.

Figure 3:
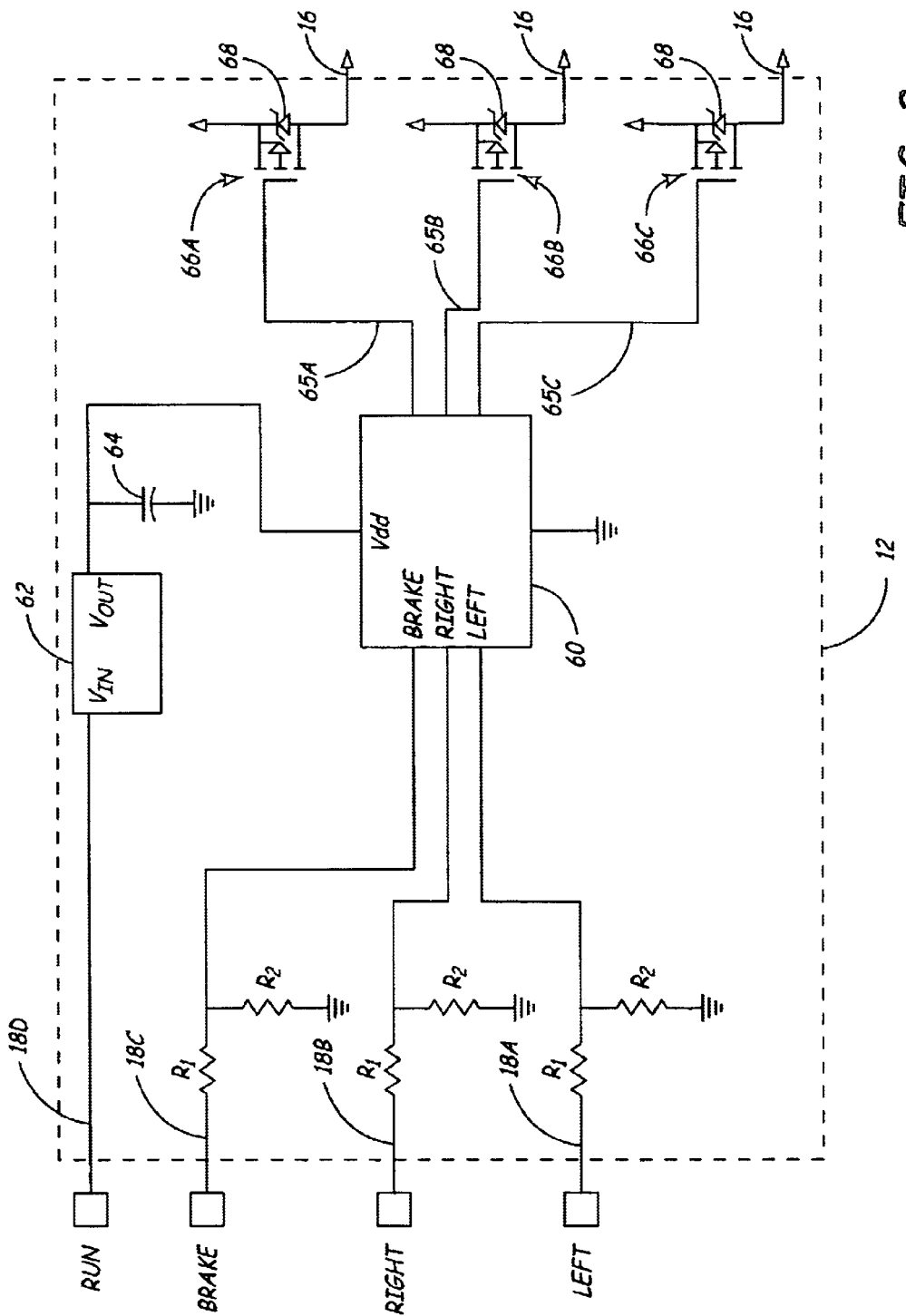
FIG. 3 is circuit diagram of a master controller in accordance with an embodiment of the invention.

FIG. 3 is a circuit diagram of master controller 12 in accordance with an embodiment of the invention. Here, microprocessor 34 and memory 36 (FIG. 1) are incorporated into a single integrated circuit chip 60. Chip 60 can be, for example, an ATMEL SOIC8 micro-controller or other suitable controller. If necessary, run input signal 18D can be provided to a DC-to-DC voltage regulator 62 to convert the power supply voltage $V_{PS}$ to an operating voltage of chip 60 (typically 5V). A capacitor 64 can be coupled between the output of the voltage regulator 62 and ground to maintain the desired voltage level in the event of voltage fluctuations at the output of voltage regulator 62. Chip 60 receives the output of voltage regulator 62 at a power input $V_{dd}$.

Each of the input signals 18A–18C can be delivered to chip 60 through a voltage divider, formed by resistors $R_1$ and $R_2$, to ensure they fall within the acceptable input voltage range for chip 60. For a 12V input signal, resistor R1 can be 3.3 K ohms and R2 can be 1.8 K ohms to maintain the input voltage levels below 5 volts, for example.

As discussed above, master controller 12 can include one or more outputs depending upon the application and the number of hot bus lines 16 that are being used. For this example, multiple output signals are provided by chip 60 to switch corresponding hot bus lines 16 that are connected to separate smart lights 14. In accordance with this embodiment, command signals can be provided on separate outputs, such as outputs 65A–65C. Each output from the microprocessor or chip 60 is connected to a corresponding switch 66A–66C that is capable of quickly opening the hot bus line 16 to thereby disconnect the smart light 14 from the power supply for a brief period of time (approximately 100 ms). If the hot bus 16 consists of only a single wire, only one output from microprocessor 26 or chip 60 to control a single switch is required.

In the present example, a p-channel FET is used for each switch 66. The gate of the FET is connected to the output of the micro-controller 60. Diodes 68 are used to positively bias the source and drain of each FET. In operation, the output 65 of the micro-controller 60 is held low to allow the power to be supplied substantially continuously to each smart light 14 connected to the hot bus 16. When an input signal is received, microprocessor 26 of master controller 12 generates the command signal along on the hot bus 16 by rapidly raising and lowering the voltage at the gate of the FET, which turns the switch "off" and "on" rapidly. This results in the rapid switching of the power supplied to the smart light 14. Thus, as mentioned above, the command signal is represented by a succession of "off" and "on" power signals along the hot bus 16.

Figure 4:
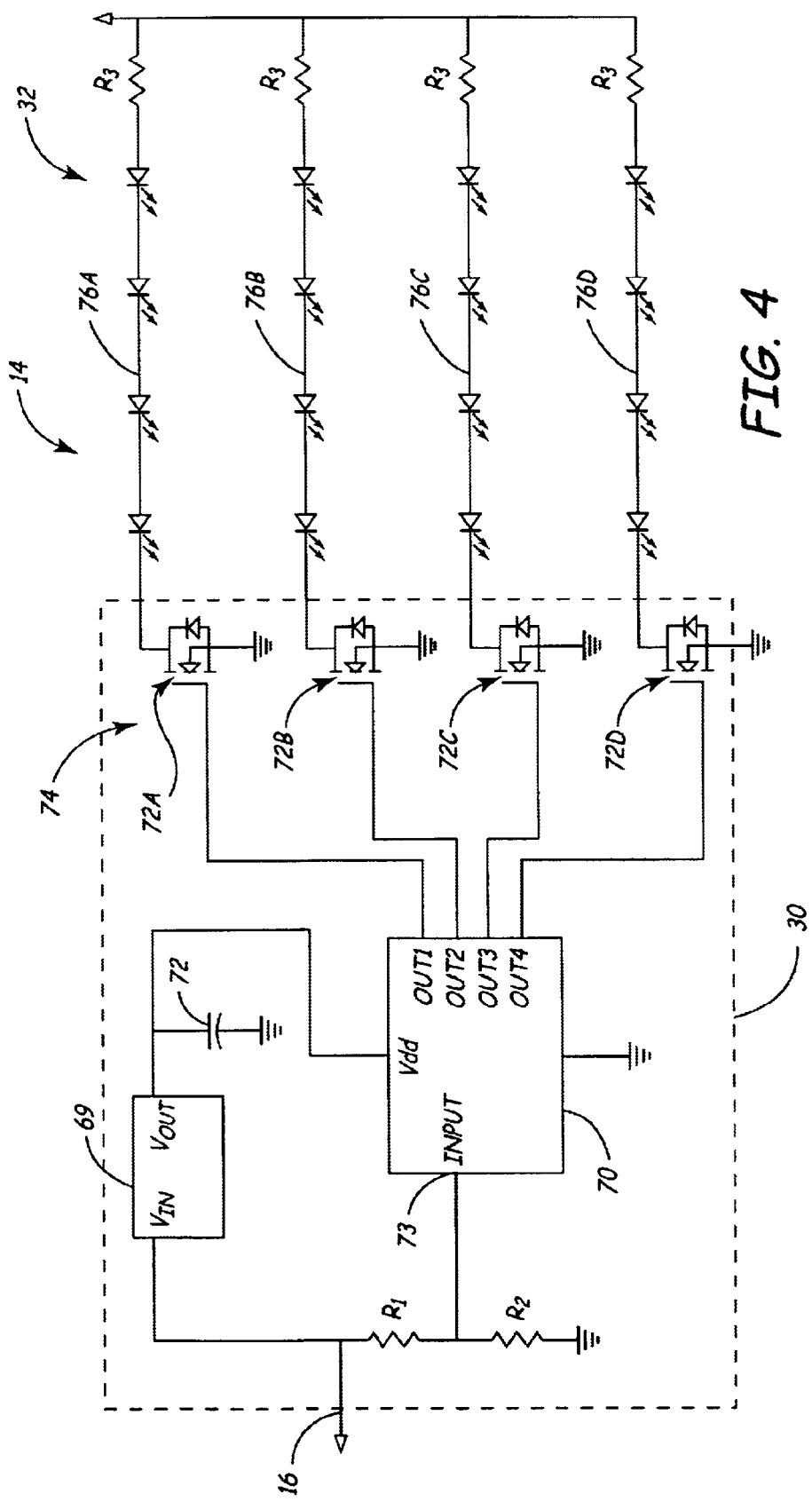
FIG. 4 is a circuit diagram of a smart light in accordance with an embodiment of the invention.

FIG. 4 is a circuit diagram of an example of a smart light 14 in accordance with an embodiment of the invention. Smart light 14 receives near continuous power at light controller 30 in the form of DC voltage $V_{PS}$ (typically 12V) from hot bus 16. The microprocessor 34 and memory 36 (FIG. 1) of light controller 30 can be combined into a single micro-controller 70. Micro-controller 70 receives an operating voltage (typically 5V) from the output of voltage regulator 69. The operating voltage is maintained at the desired level, even during periods when the command signal is provided along hot bus 16, by capacitor 72.

Command signals sent by master controller 12 over hot bus 16 are received by micro-controller 70 at a data input 73 through an appropriate voltage divider comprised of resistors R1 and R2, which reduces the voltage to within an operating range, typically 0–5V. As mentioned above, the command signal identifies an address that may or may not correspond to instructions stored in the memory of micro-controller 70. When a command signal is received that corresponds to instructions stored in memory, the microprocessor of micro-controller 70 executes the instructions, which may involve providing appropriate output signals to one or more switches 74. The switches 74 are positioned in line with hot bus 16, LED's 32 and ground. The output signals from micro-controller 70 control the opening and closing of switches 74 to thereby control the flow of current through the corresponding group of LED's 32. Resistors R3 can be placed in line with the LED's 32 to control the maximum current that is allowed to flow therethrough. Smart light 14 can include multiple groups of LED's 32, such as LED's 76A–D each respectively coupled to a switch 74A–D. Each group of LED's 76A–D can be formed of a different color, and/or located at a different portion of the circuit board (not shown) on which they are mounted along with the components of light controller 30. In the provided example, a switch 74 is provided for each group of LED's 32.

Switches 74 can be any suitable type of switch. In the example of FIG. 4, switches 74 are formed of n-channel FET's whose drains couple to ground. The gate of the FET's are connected to an output of the micro-controller. When the micro-controller 70 pulls the gate low, the switch 74 is "off" thereby opening circuit, and when micro-controller 70 pulls the gate high, the switch is turned "on" and LED's 32 are energized by the current flowing from hot bus 16 to ground.

Micro-controller 70 can control LED's 32 in accordance with the command signal received from master controller 12. This may involve activating one or more groups of LED's 32 in various manners. When, for example, smart light 14 is a center tail light 14A (FIG. 1) the command signal corresponding to a run input signal, causes light controller 30 to switch the LED's 32 at a frequency of approximately 1,000 hertz, for the desired 50% duty cycle. This prevents the LED's 32 from flickering in a visible manner and energizes them at a low or run level. On the other hand, when the command signal is a brake signal, light controller holds the gates of the switches 74 high to allow the LED's 32 to be fully energized and produce the desired high intensity brake light.

Figure 5:
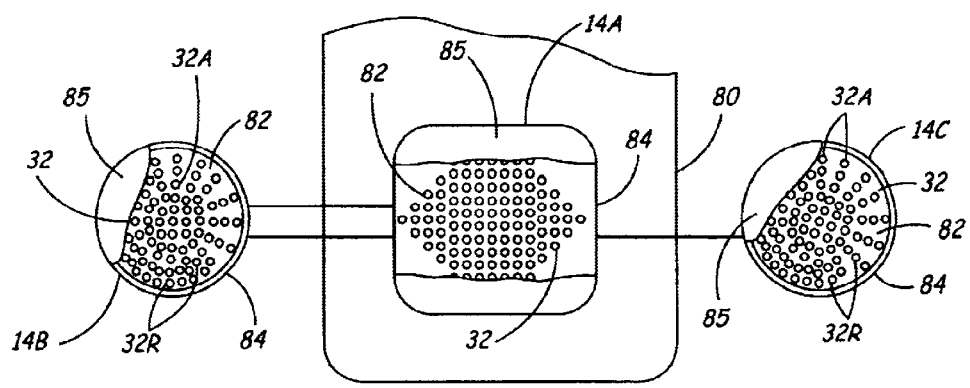
FIG. 5 is a schematic rear view of a typical fender-mounted tail light system on a motorcycle embodying principles of the invention.

Referring now to FIG. 5, a set of three smart lights operating as center tail light 14A, left tail light 14B, and right tail light 14C is illustrated in connection with a mounting on a motorcycle rear fender 80. Each of the smart lights includes a plurality of LED's 32, which are mounted to a circuit board 82. The number of LED's 32 contained in each light can be varied as desired. Each of the smart lights 14 can be enclosed in a housing 84 that includes a lens 85 covering the LED's 32. LED's 32 can be comprised of different colors and arranged in a desired pattern on the circuit board 82. The LED's 32 can also be divided up into various segments or groups of LED's, such as 76A–76D shown in FIG. 4, of the different red and amber colors, or other desired colors.

Left and right tail lights 14B and 14C can include amber colored LED's 32A that are arranged in the form of radial lines (shown), an arrow, or other shapes or designs for indicating the corresponding turn. Additionally, left and right tail lights can include red LED's 32R, which, for example, form a second group or circuit of LED's. Red LED's 32R can be energized at a low level for run lights (50% duty cycle) or at a full duty cycle for high intensity brake lights in response to command signals corresponding to the run and brake input signals 18D and 18C, respectively. Preferably, the red LED's 32R of the left and right tail lights 14B and 14C are turned off when they are instructed to perform a turn signal from master controller 12.

Figure 6:
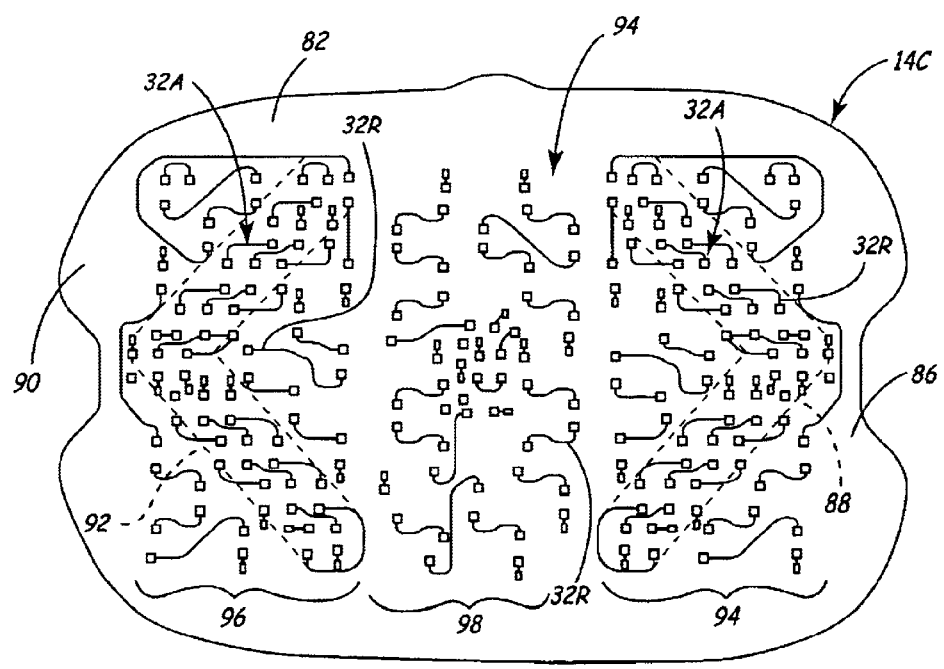
FIG. 6 is a schematic front view of a center tail light in accordance with an embodiment of the invention.

In accordance with another embodiment of the invention, center tail light 14A includes both red and amber LED's 32R and 32A, as shown in FIG. 6. The red and amber LED's can be interspersed with each other in regions of the smart light 14A and wired in separate circuits, such as circuits 76A–76D shown in FIG. 4. Each of the circuits can be controlled independently of the other. Thus, the red LED circuits 32R can each be selectively maintained at a low level for run lights (50% duty cycle) and at a high level (100% duty cycle) for braking. The circuit board 82 for center tail light 14A, shown in FIG. 6, includes 3 portions or sections that serve different functions. A right-hand portion 86 includes a group 88 of amber LED's 32A, and a left-hand portion 90 includes a group 92 of amber LED's 32A. The amber LED's 32A can be a Chevron shape pointing in the direction of the turn, as indicated by the dashed lines enclosing groups 88 and 92. Interspersed or alternated therewith, is a circuit or group 94 of red LED's 32R on the right-hand portion 86 of the circuit board 82. A second array or group 96 of red LED's 32R are interspersed or alternated with the amber LED's 32A on the left-hand portion 90 of circuit board 82. Additionally, center portion 98 of circuit board 82 includes a separate circuit of red LED's 32R.

With the layout indicated above for the smart tail lights 14A–14C, the corresponding light controllers 30 can control the various groups of LED's in response to command signals from master controller 12 to provide various light signaling features. Additionally, the LED's 32 can provide ultra-bright brake and turn signal lighting. Since LED's 32 are monochromatic, the amber LED's 32A will appear amber even through a red lens. For example, the amber LED sections or groups 88 and 92 of center tail light 14A will appear amber through the covering lens 85 (FIG. 5) even if the lens is colored red. Likewise, either clear or red lenses can be used in the turn signal light housings of left and right tail lights 14B and 14C.

FIG. 7 is a table illustrating examples of how the smart lights can be controlled by their corresponding light controller 30 in response to command signals from the master controller 12. The command signals from master controller are shown in column 100. Block 102 for left tail light 14B includes two columns that show the state of both the circuit for amber LED's 32A and the circuit for red LED's 32R. Block 104 for center tail light 14A includes columns 88, 92, 94, 96, and 98 corresponding to the right and left amber LED groups and the right, left, and center red LED groups of FIG. 6. Each of the columns indicates the state of the light for a given command signal. Finally, the state of the red and amber LED's 32R and 32A of right tail light 14C are indicated in the columns of block 106.

The "run" command signal causes the red LED's of the center tail light 14A, the left tail light 14B, and the right tail light 14C to run in a low intensity or run mode. The amber LED's 32A of the left and right tail lights 14B and 14C remain off. Additionally, the amber LED's (92 and 98) of center tail light 14A remain off.

When the command signal indicates a "brake" in response to a brake signal 18C, but without any turn signals being active, the light controllers 30 of the smart lights 14A–14C provide full power to all of the circuits made up of red LED's 32R. Thus, the red LED's 32R in both the left and right tail lights 14B and 14C as well as the red LED's 32R in center tail light 14A are operated at their brightest level. In accordance with one embodiment of the invention, the red LED's 32R are caused to flash and a flash/brake high intensity (F/BHI) function is implemented causing the red LED's 32R to flash at a rate of approximately 6 cycles per second for two seconds (12 flashes), after which the red LED's 32R remain at their high level. It should be noted that if the brakes are pumped faster than twice per second, the brake lights that are shown as being on high will flash constantly at the 6 hertz rate.

Other command signals include a "four-way flasher," in which only the amber LED's 32A flash, and "brake and four-way flashing" where only group 98 of the red LED's 32R of center tail light 14A are activated at the high intensity level.

A "left turn" command signal from master controller 12 causes light controller 30 to activate amber LED's 32A of left tail light 14B in a flashing manner with the regular turn signal rate. Additionally, light controller 30 of center tail light 14A causes group 92 of amber LED's 32A on the left hand side 90 to flash at the turn signal rate. The red LED's 32R in the left tail light 14B and the left group 96 of center tail light 14A are off, while the remaining red LED's of the center tail light 14A remain in the low-level run mode. The right turn amber LED's 32R are also off, but could be activated if desired.

When the command signal relates to a "brake and left turn," it can be seen that the red LED's 32R on the left side 90 of the center tail light 14A are off, as are the red LED's 32R and the left tail light 14D. However, the center and right groups 98 and 94 of red LED's 32R of center tail light 14A are at the high level and can be flashed as discussed above.

When the command signal relates to a "right turn" signal, the amber LED's of left tail light 14B are off, and the right group 88 of amber LED's in the center tail light 14A and the amber LED's in the right tail light 14C are flashing at the regular turn signal rate. Additionally, the right group 94 of red LED's 32R of the center tail light 14A are off.

When the command signal relates to a "right turn and brake," the red LED's of left tail light 14B as well as the left and center groups 96 and 98 of center tail light 14A are activated in the brake mode and can be flashed as discussed above. The right group 94 of red LED's 32R of center tail light 14A and the red LED's 32R of right tail light 14C are off. The amber LED's 32A indicating the right turn are energized in right tail light 14C as well as the right group 88 of amber LED's of center tail light 14A.

The LED's 32 that are selected are super-bright output LED's that are conventionally available, and are wired in groups that are concentrated for the size of the lens used. The color of the LED's is independent of the lens that is used, and there is a vastly improved brilliance of the red tail lights, as well as the turn signals, with the reduction in power of approximately ⅕ of that needed to get the same light out of incandescent lights.

Although the present invention has been described with reference to preferred embodiments, workers skilled in the art will recognize that changes may be made in form and detail without departing from the spirit and scope of the invention. For example, many other configurations for the LED's is possible, including different patterns and colors than those discussed above. Additionally, the above-described manner in which the LED's are controlled is merely provides one example of the almost limitless lighting scheme possibilities the present invention can be used to create. Moreover, those skilled in the art understand that many different configurations are possible for the lighting control system including the use of different electronic components, while still encompassing the spirit of the present invention.

What is claimed is:

1. A motor vehicle lighting system comprising:
   a master controller electrically couplable to a power supply and adapted to receive an input signal corresponding to at least one of a left turn signal, a right turn signal, a run signal, or a brake signal, the master controller having a digital command signal output that is produced in response to the input signal;
   a smart light having a light controller and a plurality of light emitting diodes (LED's), the light controller adapted to control the LED's in response to the command signal; and
   a hot bus electrically coupling the master controller to the smart light, wherein power and the command signal are provided to the smart light over the hot bus.

2. The system of claim 1, including a light socket electrically coupled to the hot bus, wherein the smart light electrically couples to the hot bus through the socket.

3. The system of claim 1, wherein:
   the light controller includes a microprocessor and a memory;
   the command signal identifies instructions stored in the memory; and
   the microprocessor controls the LED's in accordance with the instructions.

4. The system of claim 1, wherein the smart light is a left tail light, a right tail light, a center tail light, a front left turn light, or a front right turn light.

5. The system of claim 1, wherein:
   the LED's are of at least two different colors; and
   the light controller provides separate control of the different colored LED's.

6. The system of claim 1, wherein the smart light includes a housing surrounding a circuit board, which contains the light controller and the LED's.

7. The system of claim 1, wherein the light controller provides two different states of energization of the LED's.

8. The system of claim 1, wherein the smart light is a center tail light and includes a circuit board containing the plurality of LED's, the plurality of LED's being of red and amber colors, the amber LED's mounted on right and left side portions of the circuit board, the light controller energizing the red LED's at a low level for run lights and a high-level for brake lights.

9. The system of claim 8, wherein the red LED's are separated into three groups on the circuit board: one positioned on a center portion, one positioned on the right side portion, and one positioned on the left side portion; each group of red LED's being individually controllable by the light controller, the group of red LED's on the right side portion being off when the amber LED's on the right side portion of the circuit board are energized, and the group of red LED's on the left side portion of the circuit board being off when the amber LED's on the left side portion of the circuit board are energized.

10. The system of claim 1, wherein the master controller includes a bypass connection that is couplable to the input signal, whereby the input signal can bypass the master controller when enabled.

11. The system of claim 1, wherein the digital command signal comprises voltage pulses over the hot bus.

12. The system of claim 1, including at least one additional smart light coupled to the hot bus.

13. The system of claim 1, wherein the master controller includes at least one additional digital command signal output for controlling another smart light.

14. The system of claim 1, wherein the master controller is adapted to receive at least one additional input signal.

15. A method of controlling a lighting system of a motor vehicle comprising steps of:
   a) receiving an input signal corresponding to at least one of a left turn signal, a right turn signal, a run signal, or a brake signal;
   b) producing a digital command signal in response to the input signal;
   c) providing power and the command signal to a smart light over a hot bus, the smart light having a plurality of light emitting diodes (LED's) and a light controller; and
   d) controlling the LED's in response to the command signal using the light controller.

16. The method of claim 15, wherein the producing step b) includes producing voltage pulses over the hot bus representing bits of data.

17. The method of claim 15, wherein the controlling step d) includes switching power to the LED's.

18. The method of claim 15, wherein:
   the light controller includes a microprocessor and a memory; and
   the controlling step d) includes retrieving instructions from the memory corresponding to the command signal with the microprocessor and controlling the LED's in accordance with the instructions.

* * * * *